United States Patent

Miki

[11] Patent Number: 5,241,361
[45] Date of Patent: Aug. 31, 1993

[54] PATTERN SHIFT MEASURING METHOD

[75] Inventor: Katsuhiko Miki, Fukushima, Japan

[73] Assignee: Shin-Etsu Handotai, Tokyo, Japan

[21] Appl. No.: 763,723

[22] Filed: Sep. 23, 1991

[30] Foreign Application Priority Data

Oct. 31, 1990 [JP] Japan .................................. 2-296977

[51] Int. Cl.$^5$ .............................................. G01B 11/00
[52] U.S. Cl. ..................................................... 356/373
[58] Field of Search ................ 356/372, 373, 399–401, 356/384, 387; 355/43, 53

[56] References Cited

U.S. PATENT DOCUMENTS

| | | | |
|---|---|---|---|
| 4,362,389 | 12/1982 | Koizumi et al. | 356/150 |
| 4,385,837 | 5/1983 | Schram | 356/384 |
| 4,659,936 | 4/1987 | Kkawa et al. | 356/387 |

FOREIGN PATENT DOCUMENTS 64-31413 2/1989 Japan .
64-31414 2/1989 Japan .

OTHER PUBLICATIONS

Patent Abstracts of Japan, vol. 15, No. 183, May 10, 1991, Abstract of No. 03-44056.
Patent Abstracts of Japan, vol. 14, No. 408, Sep. 4, 1990, Abstract of No. 02-152250.
Patent Abstracts of Japan, vol. 14, No. 273, Jun. 13, 1990, Abstract of No. 02-86116.
Patent Abstracts of Japan, vol. 13, No. 220, May 23, 1989, Abstract of No. 01-31414.
Patent Abstracts of Japan, vol. 13, No. 220, May 23, 1989, Abstract of No. 01-31413.
Patent Abstracts of Japan, vol. 13, No. 139, Apr. 6, 1989, Abstract of 63-301541.
Patent Abstracts of Japan, vol. 12, No. 492, Dec. 22, 1988, Abstract of No. 63-204105.
Patent Abstracts of Japan, vol. 12, No. 239, Jul. 7, 1988, Abstract of No. 63-29943.
Patent Abstracts of Japan, vol. 11, No. 99, Mar. 27, 1987, Abstract of No. 61-251124.
Patent Abstracts of Japan, vol. 10, No. 82, Apr. 2, 1986, Abstract of No. 60-227472.

Primary Examiner—F. L. Evans
Attorney, Agent, or Firm—Nikaido, Marmelstein, Murray & Oram

[57] ABSTRACT

A method of measuring pattern shift on a diffused semiconductor wafer after an epitaxial process including measuring a ratio between the line width of a linear pattern vertical to an orientation flat and line width of a linear pattern parallel to the orientation flat and estimating the shift between these patterns.

3 Claims, 3 Drawing Sheets

PATTERN SHIFT MEASURING METHOD

BACKGROUND OF THE INVENTION

1. Field of the Invention:

This invention relates to a method of measuring shift of patterns of a diffused semiconductor wafer after growth of an epitaxial layer thereon, and more particularly to a method of measuring the pattern shift without destroying the semiconductor wafer and in a short period of time.

2. Description of the Related Art:

It is essential to control the shift of a buried diffusion pattern after growth of an epitaxial layer in a bipolar transistor in an IC. For this purpose, the growth conditions (such as reaction temperature and reaction speed) should be always controlled to assure constant pattern shift. However, it is very difficult to strictly control the growth conditions since frequent measurement of the pattern shift is inevitable.

Conventionally, the angular lapping stain method is used for this purpose. This method comprises: (1) slicing chips having a buried layer in parallel to and perpendicular to the orientation flat by using a dicing saw; (2) angular polishing of optional surfaces of the sliced tips ($\theta = 11° 32'$); (3) etching the polished surfaces (Sirtl, 2 to 3 seconds); and (4) measuring the shift of the patterns of the buried layers by using differential, interference micrographs (x 150).

The pattern shift factor is obtained by the following equation:

the pattern shift factor = the amount of shift ($\mu$m)/the thickness of the epitaxial layer ($\mu$m)

However since it takes approximately two hours to measure the pattern shift and requires destruction of specimens, this conventional method cannot be used so frequently and is rather expensive.

To solve the problem of the conventional method, some proposals are made to perform the pattern shift measurement through non-destructive tests as disclosed in such publications as Japanese Patent Laid Open Publications 64-31413 and 64-31414. Under the present circumstances, there is a great demand for a more simplified and reliable method of measuring the pattern shift.

SUMMARY OF THE INVENTION

It is therefore an object of this invention to provide a method of reliably measuring the pattern shift of a semiconductor wafer in a short period of time without destroying the semiconductor wafer.

According to this invention, there is provided a method of measuring a shift between a diffusion pattern and a corresponding pattern on an epitaxial layer of a semiconductor wafer after the epitaxial process. The method comprises measuring a ratio between the line width of a linear pattern vertical to the orientation flat and line width of a linear pattern parallel to the orientation flat to determine the shift between these patterns.

The pattern shift can be also determined only by measuring the line width of a linear pattern vertical to the orientation flat.

Further, the pattern shift is determined only by measuring the line width of a linear pattern parallel to the orientation flat.

According to this invention, the pattern shift can be reliably and inexpensively measured in about five minutes without destroying the semiconductor wafers.

Many other objects, advantages and features of the present invention will be better understood from the following description taken in conjunction with the accompanying drawings.

DETAILED DESCRIPTION

One embodiment of this invention will now be described with reference to the accompanying drawings.

Measurement was performed under the following conditions:

Specimens; CZ p-type semiconductor wafer <111> off-angle 3° 30' in <112> 100$\phi$, 10–20$\Omega$-cm, OF<110>

Buried diffusion layer; Sb, 15$\Omega$/□, depth 8 mm

Width of the buried diffusion layer; 60 $\mu$m

Epitaxial layer growth; 10 $\mu$m, 1$\Omega$-cm

Reaction furnaces used; Cylindrical and vertical furnaces

Reaction temperatures; 1150°, 1100° and 1050° C.

Reaction speeds; 0.30 and 0.60 $\mu$m/min

Reaction pressure; 760 Torr

Measurement; A Nomarski differential microscopic interferometer (magnification factor, ×200) was used to measure the line width ($W_V$) of a pattern vertical to the OF(orientation flat), and the line width ($W_H$) of a pattern parallel to the OF. The measured values and the ratio $W_V/W_H$ are shown in Table 1.

TABLE 1

| Furnace type | Reaction temperature (°C.) | Reaction speed $\mu$m/min | Conventional pattern shift ratio | $W_V$ ($\mu$m) | $W_H$ ($\mu$m) | $W_V/W_H$ |
|---|---|---|---|---|---|---|
| Vertical furnace | 1150 | 0.30 | 0.594 | 61.9 | 63.2 | 0.98 |
| | " | 0.54 | 0.900 | 61.9 | 63.9 | 0.97 |
| | 1100 | 0.30 | 0.986 | 61.3 | 65.2 | 0.94 |
| | " | 0.53 | 1.11 | 60.6 | 66.5 | 0.91 |
| | 1050 | 0.30 | 1.32 | 58.7 | 69.1 | 0.85 |
| | " | 0.53 | 1.32 | 56.7 | 68.5 | 0.83 |
| Cylindrical furnace | 1150 | 0.25 | 0.98 | 61.9 | 63.9 | 0.97 |
| | " | 0.56 | 1.23 | 60.6 | 65.9 | 0.92 |
| | 1100 | 0.28 | 1.35 | 60.6 | 67.8 | 0.89 |
| | " | 0.57 | 1.48 | 58.7 | 69.8 | 0.84 |
| | 1050 | 0.30 | 2.11 | 54.8 | 70.4 | 0.78 |
| | " | 0.58 | 2.01 | 56.7 | 70.4 | 0.81 |

$W_V/W_H$ = Line width ($W_V$) vertical to OF<110>/Line width ($W_H$) parallel to OF<110>.

Figure 1:
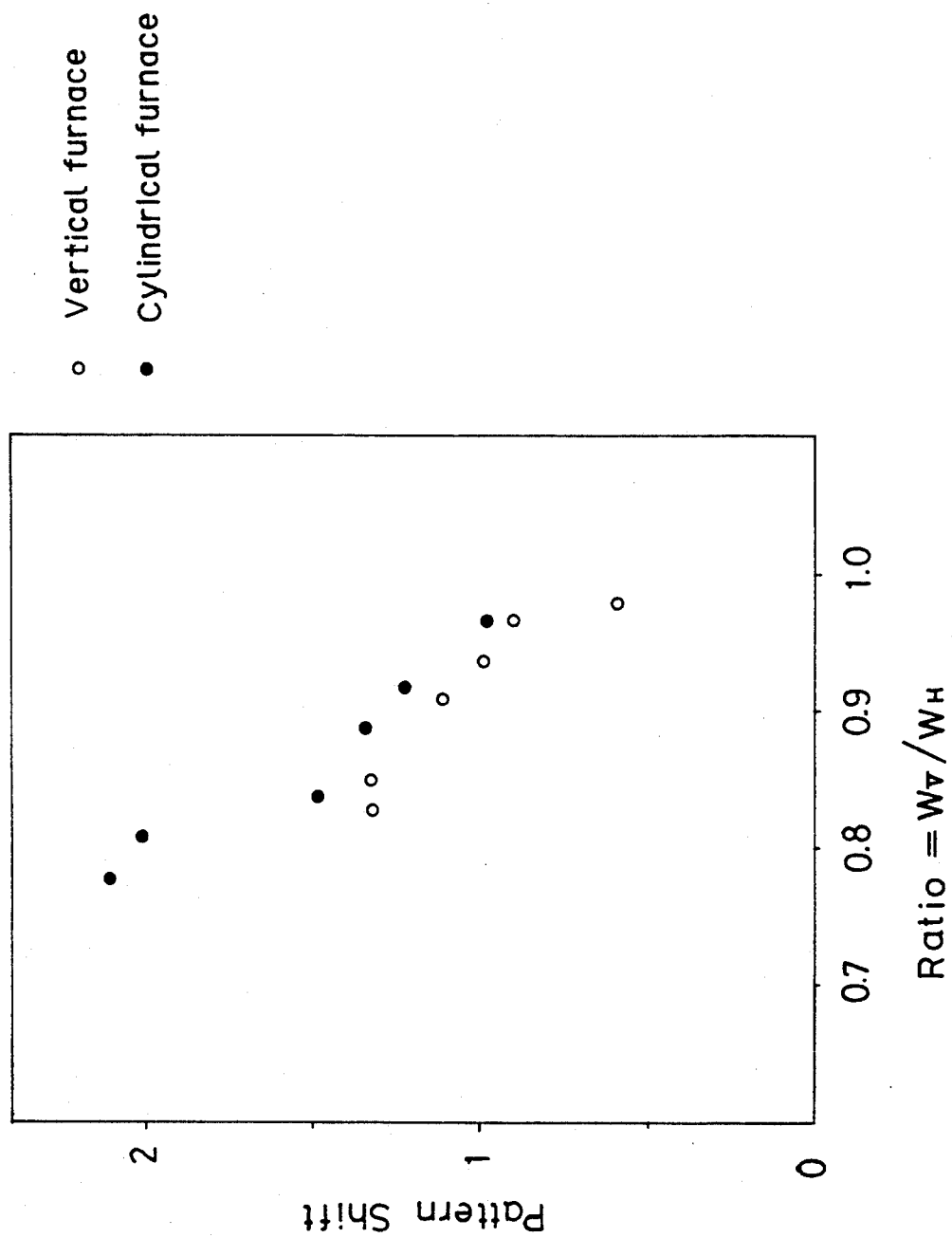
FIG. 1 shows a correlation between a ratio $W_V/W_H$ obtained by the method of this invention and a pattern shift ratio obtained by the conventional method.
Figure 2:
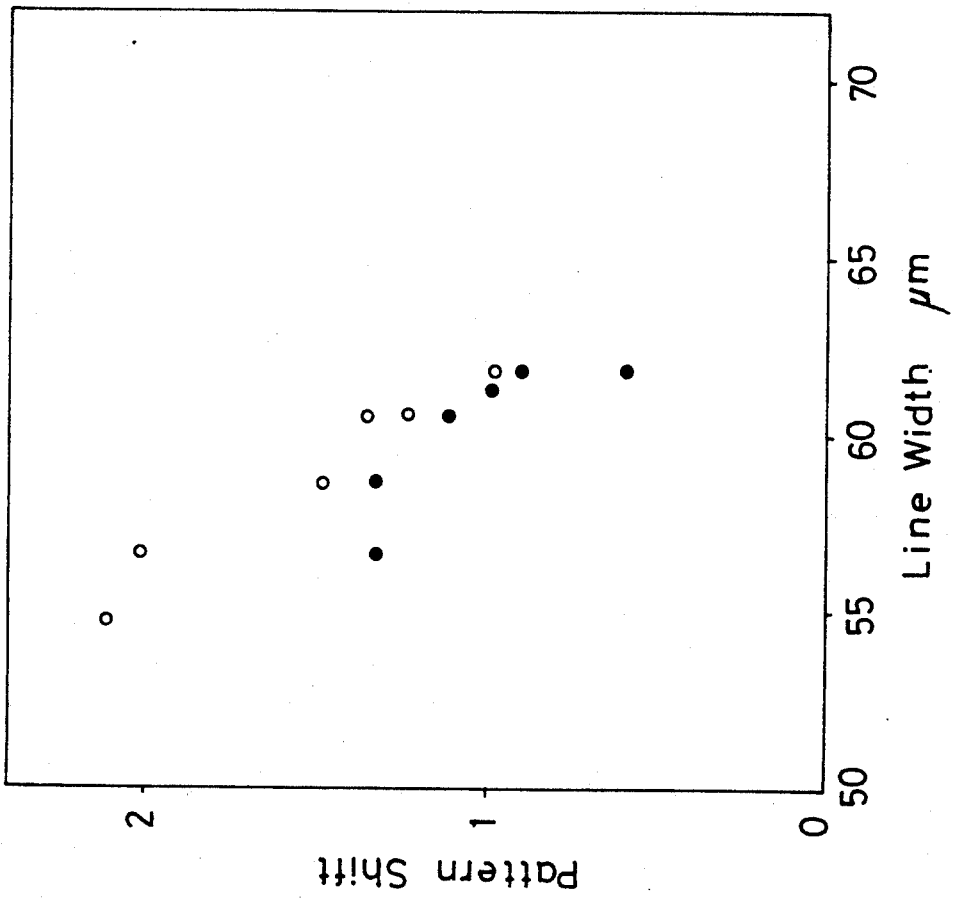
FIG. 2 shows a correlation between $W_V$ of this invention and the pattern shift ratio of the conventional method.
Figure 3:
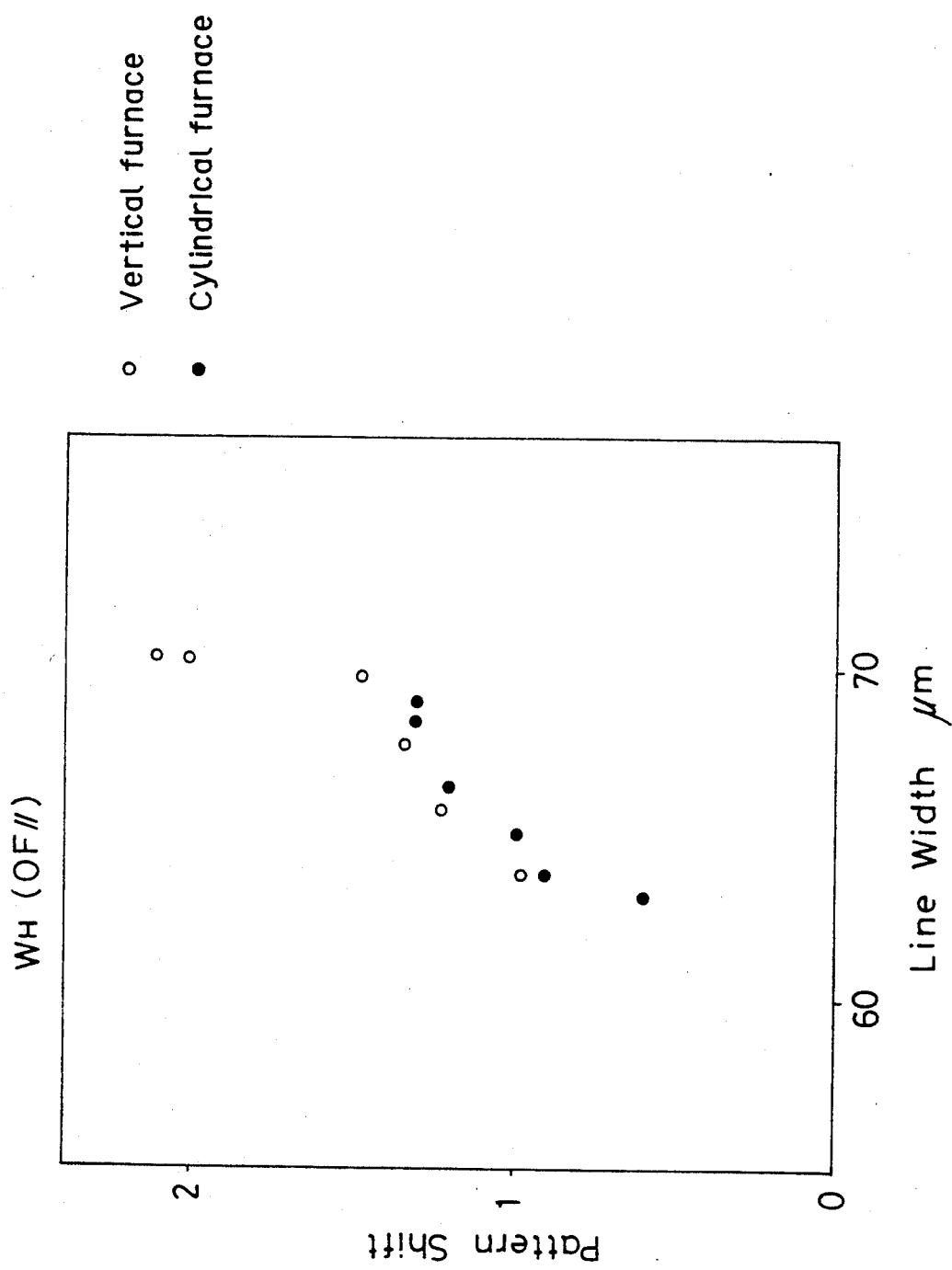
FIG. 3 shows a correlation between $W_H$ of this invention and the pattern shift ratio of the conventional method.

FIGS. 1 to 3 are graphs showing the correlation between the pattern shift ratios determined by the conventional method (angular lapping stain method), and the values $W_V/W_H$, $W_V$ and $W_H$ determined by the method of this invention.

Any of $W_V/W_H$, $W_V$ and $W_H$ have correlations to the pattern shift ratio of the conventional method ($W_V/W_H$ and $W_V$ have negative correlations and $W_H$ has a positive correlation to the conventional pattern shift ratio). It was confirmed that the pattern shift can be determined by measuring $W_V/W_H$, and $W_V$ or $W_H$.

In this embodiment, the buried diffusion layer is antimony (Sb). The method of this invention is also applicable to buried diffusion layers of impurities such as boron (B), phosphorous (P) and arsenic (As).

According to this invention, it is possible to measure the pattern shift of the epitaxial semiconductor wafer in a short period of time without destroying the wafer. Therefore, measurement can be performed very frequently so that the growth conditions can be always kept optimum.

What is claimed is:

1. A method of estimating a shift between a diffusion pattern on a semiconductor wafer and a pattern on a epitixial layer thereof after an epitaxial process, said method comprising the steps of:
    measuring a line width of a linear pattern vertical to an orientation flat;
    measuring a line width of a linear pattern parallel to the orientation flat; and
    estimating the shift between these patterns based on a ratio of the measured line widths.

2. A method of estimating a shift between a diffusion pattern on a semiconductor wafer and a pattern on an epitaxial layer thereof after an epitaxial process, said method comprising the steps of:
    measuring a line width of a linear pattern vertical to an orientation flat; and
    estimating the shift between these patterns based on the measured line width.

3. A method of estimating a shift between a diffusion pattern on a semiconductor wafer and a pattern on an epitaxial layer thereof after an epitaxial process, said method comprising the steps of:
    measuring a line width of a linear pattern parallel to an orientation flat; and
    estimating the shift between these patterns based on the measured line width.

* * * * *